July 7, 1970

H. E. ERIKSON 3,519,820

MONITORING DEVICE FOR INDICATING A GIVEN RANGE
OF INCIDENT RADIATION

Filed Aug. 13, 1965

INVENTOR.
Herman E. Erikson
BY Brown and Mikulka
and
Charles S. McGuire
ATTORNEYS July 7, 1970

H. E. ERIKSON 3,519,820

MONITORING DEVICE FOR INDICATING A GIVEN RANGE
OF INCIDENT RADIATION

Filed Aug. 13, 1965

INVENTOR.
Herman E. Erikson
BY Brown and Mikulka
and
Charles S. McGuire
ATTORNEYS

United States Patent Office 3,519,820
Patented July 7, 1970

3,519,820
MONITORING DEVICE FOR INDICATING A GIVEN RANGE OF INCIDENT RADIATION
Herman E. Erikson, Winchester, Mass., assignor to Polaroid Corporation, Cambridge, Mass., a corporation of Delaware
Filed Aug. 13, 1965, Ser. No. 479,527
Int. Cl. G01t 1/20
U.S. Cl. 250—71.5    1 Claim

ABSTRACT OF THE DISCLOSURE

The present application relates to a compact, relatively-simple and hence inexpensive device for indicating possibly injurious levels of incident radiation, e.g., X-ray and gamma radiation, within specified ranges. In its basic form, the device consists merely of a small housing element opaque to visible light but pervious to X-rays and gamma rays, an activatable component such as a given fluorescent substance or phosphor carried by and substantially coextensive with support means therefor of given area having a given range of light output and responsive to a given range of incident radiation, and components of an electrical circuit comprising a source of a given D.C. voltage such as a miniature battery, a photoresistor component physically superimposed with the aforesaid activatable component, and an indicating component such as an ammeter for providing a given range of current readings calibrated in terms relating to the radiation to be measured. In modified form, the device includes means for augmenting the range of incident radiation to which the device is sensitive. The indicating component may be enclosed in the housing or remotely situated, as provided by external connector means.

---

Heretofore, dosimeters and scintillation counters have been used to measure radiation. Dosimeters, which include photographic film badges, are count-integrating devices used in conjunction with standard particle detectors. This type of device gives a measure of cumulative exposure. Scintillation counters are count-rate devices utilizing a detecting element which, upon being irradiated, produces a short burst of light or scintillation for each occurrence of radiation. The detecting element is positioned adjacent to a photomultiplier tube so that light bursts produced by the impinging radiation are intercepted by the photoelectric cathode of the photomultiplier. This latter tube then produces, in a known manner, an electrical output signal for each light burst emitted by the detecting element which may then be counted in an electronic circuit to produce an indication of the amount of radiation impinging on the radiation detector. The use of such fast, sensitive photomultiplier tube in conjunction with radiation-sensitive detection elements having a high light intensity and a very fast decay time allows the detection of events occurring very close together in time. Photomultiplier scintillation counters are precision devices requiring relatively expensive components.

The device of the present invention is used to measure the relative dynamic level of impinging radiation rather than to count the rate of incident radiation. By using a photoresistor in place of the more accurate and expensive photomultiplier tube, it is possible to construct an inexpensive and compact device which fits in between dosimeter devices and scintillation counters to provide a personal monitoring device for detection of varying radiation levels.

The invention accordingly comprises the apparatus possessing the characteristics, combination of elements, and arrangement of parts which are exemplified in the following disclosure, and the scope of the application of which will be indicated in the claims.

For a fuller understanding of the nature and objects of the invention, reference should be had to the following detailed description taken in connection with the accompanying drawings wherein.

Figure 1:
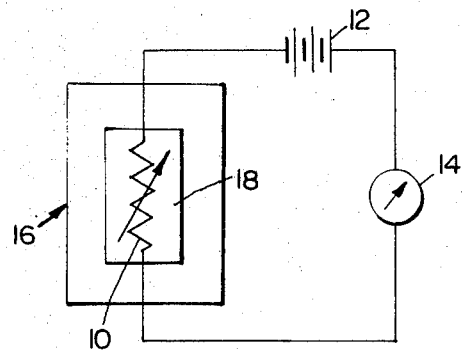
FIG. 1 is a schematic diagram of the elemental device of the present invention.

Referring now to the drawings, FIG. 1 illustrates the basic device of the present invention wherein a light-responsive resistance means 10 is connected in series with a voltage source 12 and a measuring means 14. Resistance means 10 is located within a light-tight housing 16 which also contains a radiation-responsive lighting means 18 located proximate to resistance means 10.

Light-responsive resistance means 10 is preferably a photoresistor of any well-known type, such as cadmium sulphide or cadmium selenide, which undergoes a substantial change in resistance in response to changes in ambient light incident thereon. Photoresistor 10 may have any convenient shape, such as a relatively thin wafer, either round, square, or otherwise. Lighting means 18 is preferably an activatable light-emitting crystalline phosphor such as cadmium zinc sulfide, which is available commercially as a fluoroscopic screen type CB-2 from Du Pont, Inc. As described in greater detail below, a less sensitive phosphor such as calcium tungstate or barium lead sulfate having a faster decay might also be used. In the latter case, the rate of count incidents would be increased by approximately a factor of 10. Other radiation-sensitive elements such as sodium iodide or potassium iodide, both of which are crystalline phosphors, might also be used. However, the latter two phosphors are generally used as comparatively large-sized crystals. The preferred phosphors may be coated on a thin film backing such as acetate or Mylar on a glass surface. This backed phosphor is located proximate to the photoresistor element 10, as previously mentioned. In some instances, it may be desirable to coat the phosphor on envelope means within which the photoresistor is commonly contained, thereby obtaining a completely surrounding light-emitting coating.

The device of the present invention is designed to monitor X-ray and nuclear radiation. By the expression "nuclear radiation," there are included atomic and nuclear particles of all types, masses, as well as quanta. Thus, there are included alpha particles, beta particles, gamma rays and neutrons.

Housing 16 is constructed of materials opaque to radiation having wavelengths longer than that of X-rays. Normally, the casing material is a substance having a low atomic weight such as Bakelite or carbon-saturated polyethylene. Such plastics could conveniently form housing 16 when the device is to be used for the measurement of X-rays and/or gamma rays; however, they tend to absorb neutrons. If it is desired to measure the neutron level, it is possible to design housing 16 using a metallic material such as aluminum.

Voltage source 12 is preferably a D.C. supply battery connected across light-responsive means 10. A suggested voltage is 45 v. although this may include one or more subcombinations of batteries having different voltage levels, whereby various ranges may be selected for use with output means 14. Output 14 is an ammeter which, in combination with voltage source 12, gives a visual output reading, normally by means of a deflectable needle, of the varying resistance of light-responsive resistance means 10. The voltage source and meter thus function as an ohmmeter. In some applications, it may be desirable to use an A.C. supply as source 12 although this would tend to limit the portability of the device of the present invention. Although not shown in the drawings, it might be desirable in some applications to include an amplifier to amplify the current passing through resistance means 10. This latter consideration involves balancing the available voltage against the cost of meters having requisite sensitivity to provide a meaningful output reading. The scale of the output device may be calibrated to one or more ranges of radiation intensities by exposure to known radiation sources. Commercial units utilizing the same type of components would have a standardized output scale.

The device as above described is essentially a monitor of a specific range of radiation preselected by selection of the phosphor type, the photoresistor, and the battery voltage to be used. The more flexible devices described below permit selection of two or more ranges of radiation levels within the detecting portion of the device itself.

Figure 2:
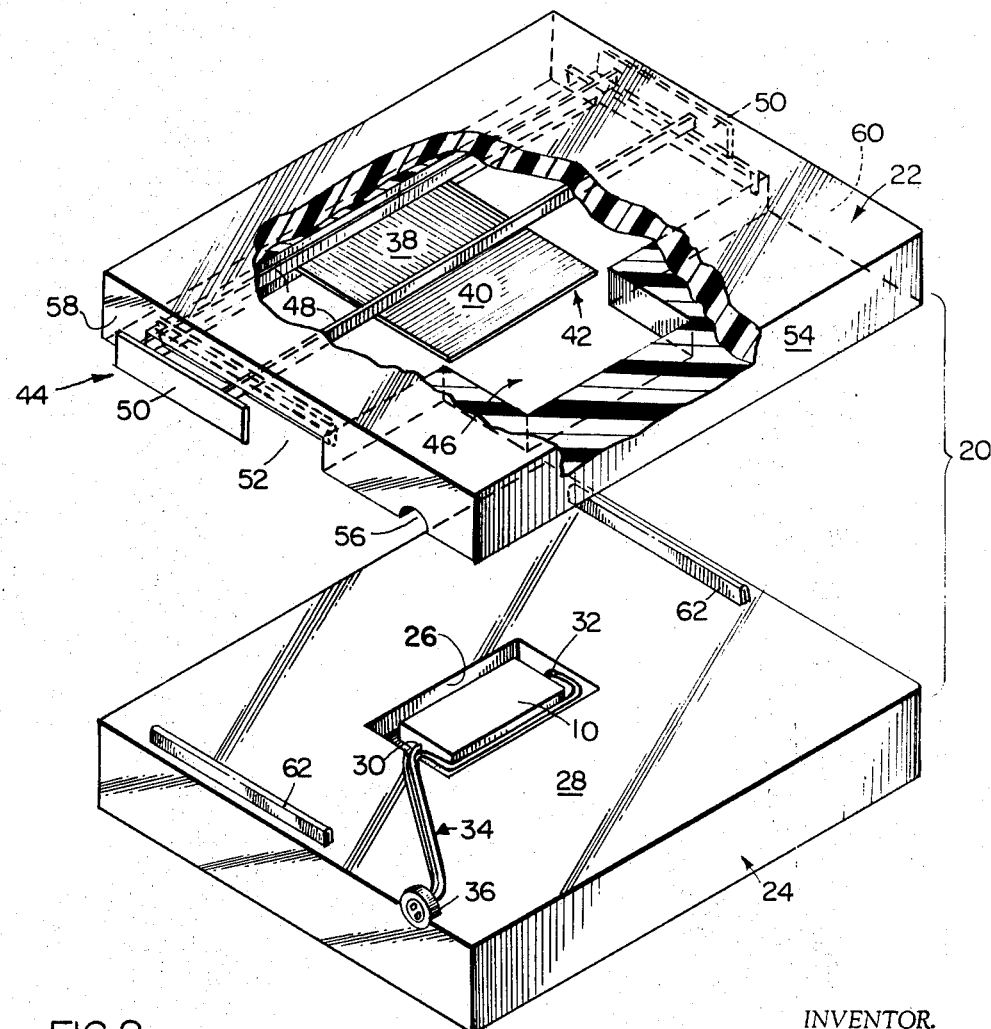
FIG. 2 is a somewhat diagrammatic, exploded perspective view of one form of the detecting portion of the present invention provided for monitoring different levels or types of radiation intensity.

FIG. 2 illustrates a diagrammatic view of one form of the detecting portion of the present invention wherein two or more phosphor elements are selectively provided to cooperate with the light-responsive resistance means. As shown, light-tight housing 20, corresponding to housing 16 of the schematic showing of FIG. 1, includes top portion 22 and bottom portion 24, both of which may comprise suitable molded plastic bodies. Bottom portion 24 contains a cavity 26 in the interface surface 28 thereof which holds a light-responsive resistance means, such as photoresistor 10. The electrical leads connected to photoresistor terminals 30 and 32 are preferably laid in a channel 34 to connect with a terminal connector or jack 36.

In a preferred use, the detecting portion comprising the light-responsive resistance element and the radiation-sensitive lighting element may be located at a distance from the voltage source and output means, thus permitting the user to put the detecting means in the radiation field without exposing himself during measurement. Therefore, the detecting device has a terminal connector 36 thereon or, in the absence thereof, the photoresistor terminals may be connected directly to the battery and meter through a wire cable. The device itself is sufficiently compact that the detecting, power and output or readout portions may comprise one complete package, although in the form shown only the detecting portion is confined within housing 20. Connector 36 is preferably a miniaturized connector such as a BNC type. The connector is not flush with interface surface 28, but rather extends above it to provide a means of alignment when potrions 22 and 24 are joined.

Top portion 22 contains two phosphor lighting elements 38 and 40 preferably coated on a supporting material, such as a film 42 similar to that described above in connection with phosphor element 18. Elements 38 and 40 comprise suitable phosphors, each having about the same range in light output but responsive to different livels of incident radiation. These elements are connected to a frame 44 which is fastened to support film 42 to provide rigidity to said material. Frame 44 includes parallel support members 48 which are connected to end members 50 across the ends thereof. Top portion 22 has a thin flat channel 52 in the interface surface thereof. Frame 44 with associated phosphors 38 and 40 rests in this channel for movement therein as will be presently explained. When top portion 22 is secured to bottom portion 24, a portion of connector 36 fits within molded cavity 56 of the top portion. Frame 44 is freely movable within channel 52, being bounded by interface surface 28 with end members 50 frictionally engaging side surfaces 58 and 60. End members 50 have a greater height than the depth of channel 52 such that they act as a partial light seal of the channel opening. Additionally, resilient thin strips 62 are secured to interface surface 28 and the base of channel 52 such that frame 44 is movable therebetween. These strips are positioned in vertical alignment to form an effective light seal.

In operation, frame 44 is movable between two positions, the one shown in FIG. 2, in which phosphor 40 covers cavity 26 containing photoresistor 10. In this position, incident radiation causing phosphor 40 to fluoresce will cause a response in photoresistor 10 corresponding to one level of incident radiation. When frame 44 is moved to its other position, phosphor 40 is moved away from cavity 26 into cavity 46 provided in top portion 22, and photoresistor 10 is then covered by phosphor 38. In this position the response in photoresistor 10 corresponds to a different level of incident radiation, namely, that which produces a given level of fluorescence in phosphor 38. The phosphors are so positioned on frame 44 that, when assembled, the distance between the phosphor surface and interface surface 28 is negligible. Therefore, the phosphor positioned above cavity 26 is substantially the sole source of illumination for the photoresistor, allowing measurement of differing levels or types of radiation. It is understood that while the example uses only two phosphors, the device may have a plurality of phosphors contained in the detecting portion, limited by the required photoresistor covering area and the size of the detecting portion itself.

Figure 3:
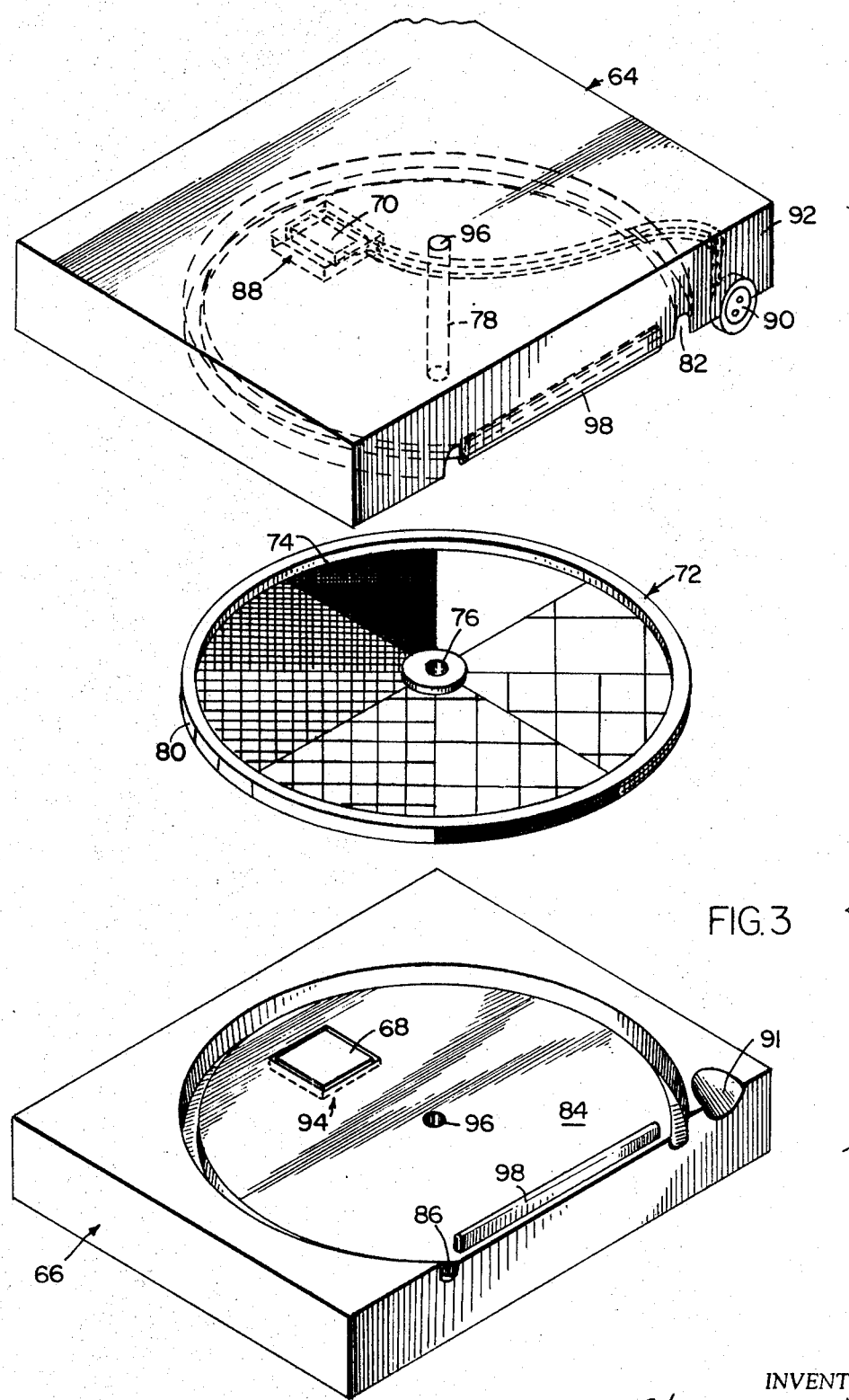
FIG. 3 is a diagrammatic exploded view of a preferred form of the detecting portion of the present invention providing for monitoring several radiation levels.

A preferred form of the detector portion of the device of the present invention is shown in FIG. 3, which is an exploded view of a form of the device capable of being set to respond to several ranges of incident radiation level by varying the amount of light emitted from a preselected phosphor upon a photoresistor. The detector portion of the device, as herein depicted, consists of top portion 64 and a bottom portion 66, both of which may comprise suitable molded plastic members. Other elements of the detector are phosphor 68, photoresistor 70, and a composite circular neutral density filter 72. Phosphor 68 and photoresistor 70 may be constructed as described above in connection with FIG. 1.

Filter 72 consists of a disk comprising a circular grouping of filter sectors 74, each of which has a different light transmission characteristic. The complete filter has elements arranged in suitable discrete steps from 0 to 100% light transmission. The interior of filter 72 includes a ring supported by spokes or a solid portion having a pivot hole in the center thereof designated generally as 76, through which a shaft 78 may be passed for rotation thereabout of filter 72. When top portion 64 and bottom portion 66 are joined; shaft 78 is secured within vertically aligned holes 96 in both portions. Filter 72 has a raised, knurled rim 80 along the circumference thereof. Top portion 64 has a circular groove 82 molded therein in which portions of rim 80 are confined. Bottom portion 66 has a truncated circular cavity 84 molded therein with a groove 86 corresponding to groove 82 along the inner rim of the cavity in which portions of rim 80 are confined within bottom portion 66. Filter 72 thus rests in cavity 84 with the surface of the body of the filter adjacent to the interface surface of top portion 64. Photoresistor 70 is located in a cavity 88 within the interface surface of top portion 64 with the electrical leads therefrom running in a channel molded within the interface surface to a terminal connector 90 located on side surface 92 in a manner similar to the arrangement described above in the device of FIG. 2. A portion of connector 90 is adapted to fit into cavity 91 in bottom portion 66. Phosphor 68 is positioned within a subcavity 94 within cavity 84 of bottom portion 66 such that the phosphor and photoresistor are in vertical alignment when the top and bottom portions are secured together with the filter portion of filter 72 interposed therebetween. Two strips 98 of resilient material are secured to the interface surface of top portion 64 and cavity 84 in vertical alignment with each other on each side of filter 72 within raised edge 80 to provide an effective light seal to the interior of the detecting portion.

Rim 80 of filter 72 has suitable indicia thereon to indicate the amount of incident radiation represented by the particular filter sector interposed between phosphor 68 and photoresistor 70. Since a portion of ring 80 is always disposed outside of the housing, the varying indicia are disposed on the ring in such a way that for any given indicia visible outside of the housing means a corresponding filter overlies phosphor element 68.

By connecting a power source and measuring device to connector 90 the detector may be used in conjunction with the radiation represented by a given filter to measure the total radiation in the manner described. By rotating filter 72, different levels of radiation may be measured with a common power source and measuring device. By using the filter sector for the minimum level of radiation, the power required for the measuring system is minimized, since higher levels of light produced by phosphor element 68 is response to higher levels of radiation are filtered to keep the range of light incident on photoresistor 70 within that which has been reduced in intensity by the selected sector.

The device of the present invention is thus seen to be a simple and compact dynamic radiation monitoring device wherein one or more ranges of X-ray or radiation intensity may be observed on a visual output means.

Although a plurality of filters or a plurality of phosphors may be used to shift the range of the device, it is apparent that suitable fixed resistors could be added to the measuring circuit to effect a change in range; or, different power sources could be used for shifting the range.

It is also apparent that in place of an ammeter calibrated to give direct readings of radiation, a suitable relay actuated signal device could be used to give an audible or visual signal in response to predetermined levels of radiation.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A monitoring device for indicating a given range of incident radiation comprising:
    (a) a compact housing element for enclosing components of said device, said element being opaque to visible light but pervious to said radiation;
    (b) a plurality of activatable light-emitting substances of given area arranged in side-by-side relation and carried by at least one support component therefor, each of said substances having a given range of light output in response to a different given range of incident radiation;
    (c) means constituting a source of predetermined relatively-low D.C. voltage;
    (d) an electrical current-indicating means calibrated in terms of said incident radiation;
    (e) a photoresistor component of given resistance characteristics having a physical configuration and an overall area substantially similar to that of each one of said plurality of light-emitting substances; and
    (f) means for providing relative movement of said photoresistor component and each one of said plurality of light-emitting substances whereby said photoresistor component and substances may optionally be placed in superimposed and contiguous relationship for light transmission therebetween.

References Cited

UNITED STATES PATENTS 2,899,560   8/1959   Nemet   250—83.3 X
3,211,910   10/1965   Anderson   250—86

RALPH G. NILSON, Primary Examiner

A. B. CROFT, Assistant Examiner

U.S. Cl. X.R.
250—83.3